United States Patent [19]

Kwon et al.

[11] Patent Number: 5,473,007
[45] Date of Patent: Dec. 5, 1995

[54] CROSSLINKED FLAME-RETARDANT RESIN COMPOSITION AND THE INSULATED WIRE HAVING LAYER USING THE ABOVE COMPOSITION

[75] Inventors: In K. Kwon; Sang M. Kim, both of Kyungki-Do, Rep. of Korea

[73] Assignee: Goldstar Cable Co., Ltd., Kyungki-Do, Rep. of Korea

[21] Appl. No.: 261,724

[22] Filed: Jun. 17, 1994

[30] Foreign Application Priority Data

Jun. 22, 1993 [KR] Rep. of Korea .................. 93-11429

[51] Int. Cl.$^6$ ..................................................... C08L 27/00
[52] U.S. Cl. ..................... 524/527; 524/404; 524/405; 524/408; 524/409; 524/411; 524/436; 524/504; 524/515; 524/568
[58] Field of Search ............................. 524/404, 405, 524/408, 409, 411, 436, 504, 515, 527, 568

[56] References Cited

U.S. PATENT DOCUMENTS 5,102,946  4/1992  Chen et al. ......................... 524/527

*Primary Examiner*—Edward Cain
*Attorney, Agent, or Firm*—Wood, Phillips, VanSanten, Clark & Mortimer

[57] ABSTRACT

The composition of the present invention is a kind of crosslinked, flame-retardant resin composition, which comprises a base polymer of EVA-VC, chlorinated polyethylene, thermal stabilizers, antioxidants, flame-retardant fillers, lubricants and monomers with multifunctional group.

The composition essentially comprises 100 weight parts of EVA-VC, 10 to 70 weight parts of chlorinated polyethylene, 40 to 120 weight parts of flame-retardant fillers, and 5 to 20 weight parts of monomer with multifunctional group.

In addition, the composition is crosslinked by electron beam to be used as the material for sheath layer of electric wire or cable durable to high voltages.

16 Claims, No Drawings

CROSSLINKED FLAME-RETARDANT RESIN COMPOSITION AND THE INSULATED WIRE HAVING LAYER USING THE ABOVE COMPOSITION

BACKGROUND OF THE INVENTION

1. Field of the invention

The present invention, in general, relates to a crosslinked, flame-retarded resin composition and the insulated wire having a sheath layer, and particularly to a crosslinked, flame-retardant resin composition capable of protecting a flammable inner material from a direct fire and an insulated wire having a sheath layer using the above composition.

2. Description of the Prior Art

It is known to those skilled to the art that an insulated wire used in high voltage-operating electric equipments such as television sets, microwave ovens, duplicators and etc. has such a structure that an electric wire is coated with an insulating layer which is encapsulated with a protecting sheath layer. As an insulating layer for the insulated wire, there has been used a polymer of polyethlylene or polypropylene. The polymers have such an excellent insulation resistance property that they are endurable to high voltages up to several tens of KVs. Such polymers, however, have a disadvantage of being combustible in themselves. To overcome the combustible property of polyethylene or polypropylene, in general, additives such as flame-retardant fillers or the like are added. The addition of such additives, however, causes to deteriorate the insulation resistance property of the polymers in spite of giving an improvement of flame-retardancy to them. So, the wire coated with the polymers having such additives is not suitable for a high voltage-operating equipment.

In an effort to make up for the deficient property of flammability of the polymers, a material for a sheath layer which protects the flammable insulating layer is made to have an excellent property of flame-retardancy. Polyvinylchloride, crosslinked polyvinylchloride or crosslinked flame-retardant polyethylene has been chiefly used for a conventional sheath layer. When they are made to have a property of high flame-retardancy, mechanical properties and flexibility thereof are deteriorated so largely that the wire sheathed with them is unsatisfactory to be applied to the electric equipments.

In fact, the sheath layer of insulated wire is not necessarily to have high insulation resistance. It is preferable to minimize deterioration of flexibility as much as possible when the material for sheath layer is made to have an excellent property of flame-retardancy. The above mentioned conventional materials for sheath layer have an excellent property of flame-retardancy and yet, do not show good flexibility. Thus, the above mentioned conventional materials are not desirable for sheath materials of insulated wire in the viewpoint of flame-retardancy and flexibility.

SUMMARY OF THE INVENTION

For solving the problems above stated, the present inventors have recognized that there exists a need for a material that is capable of being applied for an insulated wire that is suitable for high voltage-operating equipment.

Accordingly, in one aspect of the present invention, there is provided a resin composition that has good flexibility and flame-retardancy, simultaneously.

In another aspect of the present invention, there is provided the insulated wire having sheath layer of the composition.

To accomplish the foregoing and related objects, this invention comprises the features of improvement hereafter fully described and the following description setting forth in detail certain illustrated embodiments of the invention.

DETAILED DESCRIPTION OF THE INVENTION

The flame-retardant resin composition according to the present invention comprises ethylenevinylacetate-vinylchloride graft copolymer (hereinafter "EVA-VC") as a base component, which itself has fundamental flexibility and a property of flame-retardancy, as well as a good filler-loading property. EVA is a kind of ethylenevinylacetate copolymer which is structured to have an ethylene main chain from which a number of vinylacetate groups, a volumetrically large group, are pending, so has an excellent flexibility and a good filler-loading property. In EVA-VC, to the ethylenevinylacetate copolymer are grafted polyvinyl chloride chains having chloride groups that provide an excellent property of flame-retardancy for the polymer. Accordingly, this polymer is suitable for the main polymer for a flame-retardant resin composition because of its inherit properties of flexibility and flame-retardancy. In addition, EVA-VC has a property in that EVA-VC is foamed by decomposed gas generated at burning. A foamed carbonated layer plays a role of a protecting wall which is capable of preventing a flammable insulator encapsulated thereby from being directly exposed to a flame, so that a sheath layer of EVA-VC is able to prevent or retard burning.

In order to give more improvement of flame-retardant property to EVA-VC polymer, an additional method may be sought in which flame-retardant fillers are added to EVA-VC.

Flexibility and a property of flame-retardation of EVA-VC is determined by the contents of ethylenevinylacetate and vinyl chloride. In general, the more the content of ethylenevinylacetate is high, the more flexible is EVA-VC. On the other hand, the more the content of vinyl chloride is high, the better is the property of flame-retardancy. But a quantity of vinylchlorides lower the flexibility of EVA-VC. Thus, it is important to select a proper EVA-VC in which the content ratio of ethylenevinylacetate and vinyl chloride is such that EVA-VC is excellent in a property of flame-retardancy and flexibility, simultaneously.

The resin composition according to the present invention is a flame-retardant composition that comprises EVA-VC as a base component in combination with chlorinated polyethylene, thermal stabilizers, antioxidants, frame-retardant fillers, lubricants and monomers with multifunctional group.

In accordance with the present invention, there is provided flame-retardant composition essentially consists of 100 weight parts of EVA-VC, 10 to 70 weight parts of chlorinated polyethylene, 40 to 120 weight parts of flame-retardant fillers and 5 to 20 weight parts of monomers with multifunctional group.

The EVA-VC used in the present invention is preferably selected to have 25 to 75% of vinylchloride by weight.

Chlorinated polyethylene is preferable in the chlorine content of 25 to 45% by weight, and both crystalline and amorphous types are possible to employ. Chlorinated polyethylene reinforces a mechanical strength and the property of flame-retardancy and improves an adhesion to polyethylene insulator.

Flame-retardant fillers preferably comprise 10 to 30 weight parts of antimony trioxide, 10 to 80 weight parts of metal hydroxides such as aluminum hydroxide, magnesium hydroxide and etc., and 10 to 30 weight parts of zinc borate and may comprise clay, asbestos, mica, calcium carbonate, barium sulfate and etc., in addition. Antimony trioxide is burned with halogen such as chlorine to be formed into halogenated antimony, for example, antimony trichloride, and a group of non-volatile oxide compound is produced in a flame to dissipate the energy of the flame. Metal hydrate contributes to an effect of flame-retardancy by a manner in that when the metal hydrate is burned in a flame, the hydrated water is vaporized to absorb the energy of the flame. Zinc borate is known to provide an synergistic effect of flame-retardancy when used in combination with antimony trioxide, and to prohibit the generation of gas when burned.

Such a flame-retardant fillers not only provide an improvement of the property of flame-retardancy but also support the carbonated layer of EVA-VC in order not to collapse.

As the monomer with multifunctional group used in the present invention, there may be employed a monomer with bifunctional group or trifunctional group, preferably monomer with trifunctional group, such as trimethylolpropanetrimethacrylate, triarylisocyaurnate and etc.

The monomer with multifunctional group may be crosslinked by methods such as peroxide crosslinking and electron beam crosslinking. Crosslinking by electron beam energy is efficient to an extruded product such as electric wires.

A three-dimensional structure is formed by crosslinking, which plays an important role in foaming and supporting the carbonated layer when burned. Therefore, the resin composition according to the present invention must be applied with a crosslinking process.

In accordance with the present invention, an electric wire for high voltage-operating equipments which is structured to have a sheath layer of the present composition encapsulating an insulator for the wire has a satisfactory flexibility and property of flame-retardancy, simultaneously.

The present invention will become more apparent as the following description proceeds.

EXAMPLE 1

Each of compounding components was weighed as shown in Table 1. The components were mixed in an 8-inch open roller at 140±5° C. for 10 minutes, and then, two pressed sheets with thickness of 2mm and 3mm were made by press at 170° C. Specimens for testing a property of flame-retardancy and flexibility were prepared by irradiating the pressed sheets with an electron beam in exposure dose of 4 Mrad to crosslink them.

The specimen sheets had 42% of oxygen index based on ASTM D2863, so that showed an excellent property of flame-retardancy. The specimens also had −28° C. by low temperature resistant hammering test based on ASTM D746, so that showed an excellent flexibility even in low temperature.

A specimen for combustion test was prepared by extruding the composition with a single screw extruder of 75 mm diameter at 145° C. in an extrusion velocity of 100 m/min. to coat the composition on a crosslinked polyethylene insulator in a thickness of 0.9 mm, which encapsulated a copper wire of 1 mm diameter in a thickness of 0.8 mm, and irradiating the resultant wire with electron beam in exposure dose of 4 Mrad.

The specimen was put over a Bunsen burner in which the inner flame height and outer flame height were adjusted to be 30 mm and 127 mm, respectively. The flames from Bunsen burner had an oblique angle of 20 to the vertical direction of wire, and put in the specimen for 15 seconds and put out for 15 seconds. The property of flame-retardancy of the specimen was tested by repeating the putting in and out five times. Flame in the specimen was extinguished instantly on putting out the flame from Busan burner. Moreover, the specimen formed a thick and non-splitted carbonated layer when burned, which played a role of protecting or retarding the combustion of flammable insulator of crosslinked polyethylene.

COMPARATIVE EXAMPLE 1

Pressed sheets and specimens for testing a property of flame-retardancy were prepared in a manner similar to Example 1 except that an extrusion temperature for the specimen for testing a property of flame-retardancy was 170° C.

As a result, oxygen index was 32 % which was about 10% less than that of Example 1, and was −10° C. by low temperature resistant hammering test, which showed that flexibility was inferior to that of Example 1. Furthermore, a carbonated layer formed during combustion was thinner and splitted. As a result, crosslinked flammable insulator of polyethylene flowed out so that continued to burn.

EXAMPLES 2–4

Each of compounding components was weighed as shown in Table 1. Pressed sheets and specimens for testing a property of flame-retardancy were prepared in a manner similar to Example 1 to measure oxygen index and low temperature resistant hammering temperature.

Their results are given as shown in Table 1.

Alike, these materials were effective materials for sheath layer durable to high voltage.

COMPARATIVE EXAMPLES 2–3

Pressed sheets and specimens for testing a property of flame-retardancy were prepared in a manner similar to Example 1 except that an extrusion temperature for the specimen for testing a property of flame-retardancy was 170° C.

As a result, oxygen indices were about 10% less than those of Examples, and had low temperature resistant hammering temperatures of −10° C. and −3° C. which showed that their flexibility were inferior to those of Examples. Furthermore, carbonated layers formed during combustion were thinner and splitted. Alike to comparative Example 1, crosslinked flammable insulator of polyethylene flowed out so that continued to burn.

TABLE 1

| COMPOSITION | Example 1 | Example 2 | Example 3 | Example 4 | C. Example 1 | C. Example 2 | C. Example 3 |
|---|---|---|---|---|---|---|---|
| EVA-VC*1 | 100 | 100 | 100 | 100 | — | — | — |
| CPE*2 | 30 | 20 | 10 | 50 | — | — | — |
| PVC (p.d = 1300) | — | — | — | — | 100 | 100 | 100 |
| Tribasic lead sulfate | 8 | 8 | 8 | 8 | 7 | 7 | 7 |
| Antimony trioxide | 20 | 15 | 10 | 30 | 10 | 10 | 10 |
| Zinc borate | 20 | 15 | 10 | 30 | 10 | — | — |
| Magnesium hydroxide | 40 | 60 | — | 20 | 50 | — | — |
| Aluminum trihydroxide | — | — | 80 | — | — | — | — |
| Antioxidant | 2 | 2 | 2 | 2 | 1 | 1 | 1 |
| TOTM | — | — | — | — | 50 | 40 | 30 |
| Monomer with trifuntional group 3* | 15 | 10 | 10 | 20 | 10 | 5 | 5 |
| Results |  |  |  |  |  |  |  |
| Oxygen index (%) | 42 | 42 | 41 | 44 | 32 | 33 | 35 |
| Low temperature resistant hammering temperature (°C.) | −28 | −30 | −30 | −28 | −10 | −10 | −3 |
| Formation of carbonated layer *4 | A | A | A | A | B | C | C |
| Combustion test *5 | S | S | S | S | F | F | F |

*1 VC content 50%
*2 CPE: chlorinated polyethylene of Cl content 36%
*3 Trimetylolpropanetrimethacrylate or triarylisocyanurate
*4 A: excellent, B: good, C: poor
*5 S: success, F: failure From the results of Examples and Comparative Examples, it is apparent that the crosslinked, flame-retardant resin composition has good flexibility and a property of high flame-retardancy, simultaneously, so that the composition is suitable for the material for a sheath layer of wire or cable durable to high voltages.

Whilst the present invention has been described with reference to certain preferred embodiments and examples, it will be appreciated by those skilled in the art that numerous variations and modifications are possible without departing from the spirit or scope of the invention as broadly described.

What is claimed is:

1. A crosslinked, flame-retardant resin composition which essentially comprises 100 weight parts of EVA-VC having 25 to 75% by weight of vinyl chloride, 10 to 70 weight parts of chlorinated polyethylene having 25 to 45% by weight of chlorine content, 40 to 120 weight parts of inorganic flame-retardant fillers, and 5 to 20 weight parts of monomer with multifunctional group.

2. A crosslinked, flame-retardant resin composition of claim 1, wherein the flame-retardant fillers comprise 10 to 30 weight parts of antimony trioxide, 10 to 30 weight parts of zinc borate, and 10 to 80 weight parts of metal hydrate selected from a group consisting of aluminum trihydroxide and magnesium hydroxide.

3. A crosslinked, flame-retardant resin composition of claim 2, wherein the monomer with multifunctional group is a monomer with trifunctional group selected from a group consisting of trimethylolpropanetrimethacrylate and triarylisocyanurate.

4. A crosslinked, insulated electric wire having a property of flame-retardancy, which is structured to have a crosslinked protecting sheath layer that encapsulates a wire coated with an insulting layer, the sheath layer essentially comprising 100 weight parts of EVA-VC having 25 to 75% by weight of vinyl chloride, 10 to 70 weight parts of chlorinated polyethelene having 25 to 45% by weight of chlorine content, 40 to 120 weight parts of inorganic flame-retardant fillers, and 5 to 20 weight parts of monomer with multifunctional group.

5. A crosslinked, insulated electric wire having a property of flame-retardancy of claim 4, whrerin the sheath layer is crosslinked by irradiation of electron beam.

6. A crosslinked, insulated electric wire having a property of flame-retardancy of claim 4, wherein the flame-retardant fillers comprise 10 to 30 weight parts of antimony trioxide, 10 to 30 weight parts of zinc borate, and 10 to 80 weight parts of metal hydrates selected from a group consisting of aluminum trihydroxide and magnesium hydroxide.

7. A crosslinked, insulated electric wire having a property of flame-retardancy of claim 6, wherein the monomer with multifunctional group is a monomer with trifunctional group selected from a group consisting of trimethylolpropanetrimethacrylate and triarylisocyanurate.

8. A crosslinked, flame-retardant resin composition of claim 1 wherein the flame-retardant fillers is selected from the group consisting of antimony trioxide, metal hydrates, zinc borate, clay, asbestos, mica, calcium carbonate and barium sulfate.

9. A crosslinked, flame-retardant resin composition of claim 1 wherein the flame-retardant fillers comprise antimony trioxide, zinc borate, and metal hydrate.

10. A crosslinked, flame-retardant resin composition of claim 1 wherein the flame-retardant fillers comprise 10 to 30 weight parts of antimony trioxide, 10 to 30 weight parts of zinc borate, and 10 to 80 weight parts of metal hydrate.

11. A crosslinked, flame-retardant resin composition of claim 1 wherein the monomer with multifunctional group is selected from the group consisting of bifunctional and trifunctional monomers with multifunctional group, the monomer being capable of crosslinking to contribute to a three-dimensional structure.

12. A crosslinked, flame-retardant resin composition of claim 1 wherein the monomer is a methacrylate or isocyanurate.

13. A crosslinked, flame-retardant resin composition comprising EVA-VC, chlorinated polyethylene, at least one flame-retardant filler selected from the group consisting of antimony trioxide, metal hydroxide, zinc borate, clay, asbestos, mica, calcium carbonate and barium sulfate and a monomer with a bifunctional or trifunctional group capable of crosslinking to contribute to a three-dimensional structure.

14. The crosslinked, flame-retardant resin composition of claim 13 wherein the vinyl chloride content of the EVA-VC is 25–75 percent by weight.

15. The crosslinked, flame-retardant resin composition of claim 13 wherein the chlorine content of the chlorinated polyethylene is 25–45 percent by weight.

16. The crosslinked, flame-retardant resin composition of claim 13 comprising 100 weight parts of the EVA-VC, 10–70 weight parts of the chlorinated polyethylene, 40–120 weight parts of the flame-retardant filler and 5–20 weight parts of the monomer.

* * * * *